(12) United States Patent
Okamoto et al.

(10) Patent No.: US 10,736,428 B2
(45) Date of Patent: Aug. 11, 2020

(54) VEHICLE SEAT

(71) Applicant: TOYOTA BOSHOKU KABUSHIKI KAISHA, Aichi (JP)

(72) Inventors: Naoya Okamoto, Aichi (JP); Jueru Shimizu, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/419,789

(22) Filed: May 22, 2019

(65) Prior Publication Data

US 2019/0357684 A1 Nov. 28, 2019

(30) Foreign Application Priority Data

May 25, 2018 (JP) .................................. 2018-100286

(51) Int. Cl.
| | |
|---|---|
| *B60N 2/39* | (2006.01) |
| *A47C 7/44* | (2006.01) |
| *B60N 2/90* | (2018.01) |
| *B60N 2/07* | (2006.01) |
| *B60N 2/06* | (2006.01) |

(Continued)

(52) U.S. Cl.
CPC ............... *A47C 7/441* (2013.01); *A47C 7/14* (2013.01); *A47C 7/444* (2018.08); *B60N 2/10* (2013.01); *B60N 2/20* (2013.01)

(58) Field of Classification Search
CPC .... B60N 2/933; B60N 2/02; B60N 2002/026; B60N 2/39; B60N 2/22; B60N 2002/2204; B60N 2/0224; B60N 2/0232; B60N 2002/0236; B60N 2/028; A47C 1/024; A47C 1/0242; A47C 1/0246
See application file for complete search history.

(56) References Cited

U.S. PATENT DOCUMENTS 3,552,797 A * 1/1971 D'Houdain ............... A47C 7/42
297/354.1
3,628,465 A * 12/1971 Dobson ................... B61F 5/142
105/191

(Continued)

FOREIGN PATENT DOCUMENTS

| GB | 610828 A * 10/1948 ............... B60K 1/00 |
|---|---|
| JP | 07047876 A * 2/1995 ............. B60N 2/067 |

(Continued)

OTHER PUBLICATIONS

U.S. Appl. No. 16/400,732 to Naoya Okamoto et al., filed May 1, 2019.

*Primary Examiner* — David E Allred (74) *Attorney, Agent, or Firm* — Greenblum & Bernstein, P.L.C.

(57) ABSTRACT

A vehicle seat includes a movable portion, a first spring, a second spring, and a preloading device. The first spring is capable of exerting an elastic force to displace the movable portion, which is displaced in a first direction, toward the neutral position. The second spring is capable of exerting an elastic force to displace the movable portion, which is displaced in a second direction, toward the neutral position. The preloading device is capable varying at least one of an elastic force applied by the first spring to the movable portion placed in the neutral position or an elastic force applied by the second spring to the movable portion placed in the neutral position.

3 Claims, 10 Drawing Sheets

(51) Int. Cl.
*A47C 7/14* (2006.01)
*B60N 2/10* (2006.01)
*B60N 2/20* (2006.01)

(56) References Cited

U.S. PATENT DOCUMENTS

| | | | | |
|---|---|---|---|---|
| 3,632,076 | A * | 1/1972 | Rogers, Jr. | B60N 2/39 |
| | | | | 248/636 |
| 4,225,178 | A * | 9/1980 | Takada | B60N 2/4221 |
| | | | | 248/561 |
| 7,438,000 | B2 * | 10/2008 | Schneider | B61F 5/22 |
| | | | | 105/199.1 |
| 8,020,933 | B2 * | 9/2011 | Kim | B60N 2/66 |
| | | | | 297/284.8 |
| 8,100,471 | B2 * | 1/2012 | Lawall | B60N 2/4279 |
| | | | | 297/216.1 |
| 9,561,741 | B2 * | 2/2017 | Nagayasu | B60N 2/7094 |
| 9,713,380 | B2 * | 7/2017 | Gehner | A47C 1/03277 |
| 9,975,458 | B2 * | 5/2018 | Takeuchi | B60N 2/39 |
| 10,086,728 | B2 * | 10/2018 | White | B60N 2/0244 |
| 10,202,053 | B2 * | 2/2019 | Gonzalez Uribe | B60N 2/66 |
| 10,391,899 | B2 * | 8/2019 | Ketels | B60N 2/509 |
| 10,493,878 | B2 * | 12/2019 | Ketels | B60N 2/501 |
| 10,532,672 | B1 * | 1/2020 | Pinkelman | B60N 2/504 |
| 10,537,181 | B2 * | 1/2020 | Brodbeck | A47C 7/40 |
| 2009/0261642 | A1 * | 10/2009 | Dickie | A47C 7/14 |
| | | | | 297/314 |
| 2014/0191550 | A1 | 7/2014 | Katoh et al. | |
| 2015/0367756 | A1 * | 12/2015 | Katoh | B60N 2/66 |
| | | | | 297/285 |
| 2016/0159254 | A1 * | 6/2016 | Katoh | B60N 2/66 |
| | | | | 297/313 |
| 2019/0241096 | A1 * | 8/2019 | Ito | B60N 2/0232 |

FOREIGN PATENT DOCUMENTS

| | | | | |
|---|---|---|---|---|
| JP | | 07149171 A | * 6/1995 | B60N 2/39 |
| JP | | 2009262800 A | * 11/2009 | B60N 2/062 |
| JP | | 2012096703 A | * 5/2012 | |
| WO | WO2013/021497 A1 | | 2/2013 | |

* cited by examiner

VEHICLE SEAT

CROSS-REFERENCE TO RELATED APPLICATIONS

This application claims the benefit of Japanese Patent Application No. 2018-100286 filed on May 25, 2018 with the Japan Patent Office, the entire disclosure of which is incorporated herein by reference.

BACKGROUND

The present disclosure relates to a vehicle seat in which a movable portion is included in at least one of a seatback or a seat cushion.

For example, International Patent Application Publication No. 2013/021497 discloses a vehicle seat to enable an occupant to easily retain the posture during a circular motion of a vehicle. In the vehicle seat, respective movable portions are included in a seatback and a seat cushion. Each movable portion supports the occupant and is displaceable due to an inertial force applied to the occupant during the circular motion of the vehicle.

SUMMARY

The present disclosure discloses one example of a vehicle seat that is capable of inhibiting the movable portion from being responsively displaced more than necessity.

A vehicle seat comprises, for example, a movable portion included in at least one of a seatback or a seat cushion, the movable portion being displaceable with respect to seat frame; a first spring being capable of exerting an elastic force as the movable portion is displaced in a first direction, the elastic force exerted by the first spring being used to displace the displaced movable portion toward a specified neutral position; a first coupling portion configured to displace a first end of the first spring together with the movable portion as the movable portion is displaced in the first direction; a second spring being capable of exerting an elastic force as the movable portion is displaced in a second direction that is different from the first direction, the elastic force exerted by the second spring being used to displace the displaced movable portion toward the neutral position; a second coupling portion configured to displace a first end of the second spring together with the movable portion as the movable portion is displaced in the second direction; and a preloading device being capable of varying at least one of an elastic force applied to the movable portion by the first spring when the movable portion is placed in the neutral position or an elastic force applied to the movable portion by the second spring when the movable portion is placed in the neutral position.

Preferably, the preloading device includes, for example, a first adjustment nut with which a second end of the first spring is engaged; a second adjustment nut with which a second end of the second spring is engaged; a first screw rod inserted into the first adjustment nut; a second screw rod inserted into the second adjustment nut; and an actuator to rotate at least one of the first screw rod or the second screw rod. This can inhibit the movable portion from being responsively displaced more than necessary.

The vehicle seat may comprise a displacement member displaced together with the movable portion; a first locking pin displaced together with the first adjustment nut; and a second locking pin displaced together with the second adjustment nut.

The displacement member may include a first hole into which the first locking pin is inserted; and a second hole into which the second locking pin is inserted. The first hole enables the first locking pin to be displaced in directions that are parallel to axial directions of the first screw rod. The second hole enables the second locking pin to be displaced in directions that are parallel to axial directions of the second screw rod.

Preferably, the preloading device is capable of exerting a locking function. Further, during exertion of the locking function, the first locking pin is in contact with an end of the first hole and the second locking pin is in contact with an end of the second hole, the end of the second hole being placed in a symmetric position to the end of the first hole across a virtual vertical plane that crosses the movable portion placed in the neutral position. This can restrict the displacement member, in other words, the movable portion to be displaced.

Preferably, the first screw rod and the second screw rod are integral with each other as a single rod member. Further, the first screw rod and the second screw rod have respective threads that are directed oppositely to each other and have the same pitch dimensions. This enables the first screw rod and the second screw rod to rotate simultaneously.

BRIEF DESCRIPTION OF THE DRAWINGS

An embodiment of the present disclosure will be described hereinafter by way of example with reference to the accompanying drawings, in which.

DETAILED DESCRIPTION OF THE PREFERRED EMBODIMENTS

An "embodiment" to be described below is one example of embodiments. The present disclosure is not limited to specific configurations, structures, and the like that are shown in the embodiments below.

The present embodiment describes an example of a seat that is mounted onto a vehicle such as an automobile (hereinafter, referred to as a vehicle seat). Arrows and other marks that indicate directions labelled on each drawing are made for easy understanding of relationships between each drawing.

Thus, the present disclosure is not limited to the directions labelled on each drawing. The directions labelled on each drawing are based on a state where the vehicle seat of the present embodiment is assembled to the automobile.

1. Overview of Vehicle Seat

Figure 1:
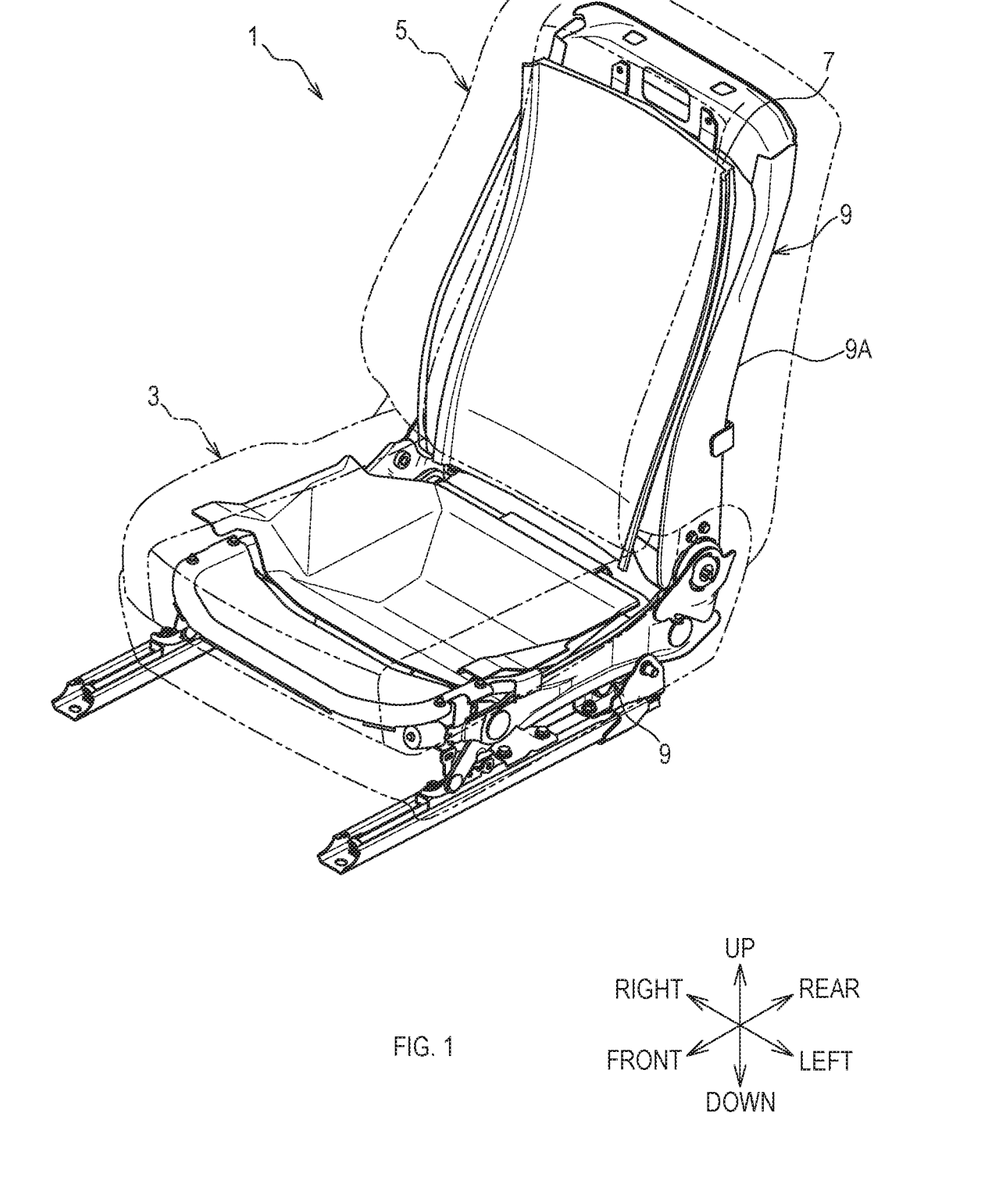
FIG. 1 is a view showing a vehicle seat.

As shown in FIG. 1, a vehicle seat 1 comprises at least a seat cushion 3, a seatback 5, and the like. The seat cushion 3 supports the buttocks of an occupant. The seatback 5 supports the back of the occupant.

At least one of the seat cushion 3 or the seatback 5 includes a movable portion 7. The movable portion 7 is displaceable with respect to a seat frame 9. The movable portion 7 is placed in a neutral position while being displaceable in a first direction D1 and in a second direction D2.

The movable portion 7 of the present embodiment is included in the seatback 5. Therefore, the movable portion 7 is displaceable with respect to a back frame 9A. The back frame 9A is a part of a framework of the seatback 5.

The movable portion 7 is swingable around a point (swing point) along a seat-width axis. A position of the swing pint is set in an upper end of the back frame 9A. Here, "the movable portion 7 being placed in the neutral position" means that the swing point and the center of gravity of the movable portion 7 are situated on a virtual vertical plane that is perpendicular to the seat-width axis, for example (see, FIG. 1).

The movable portion 7 is supported on a guide rail R1 (see, FIG. 4) that is arcuately curved around the swing point. The guide rail R1 is fixed to the seat frame 9 (the back frame 9A).

Figure 2:
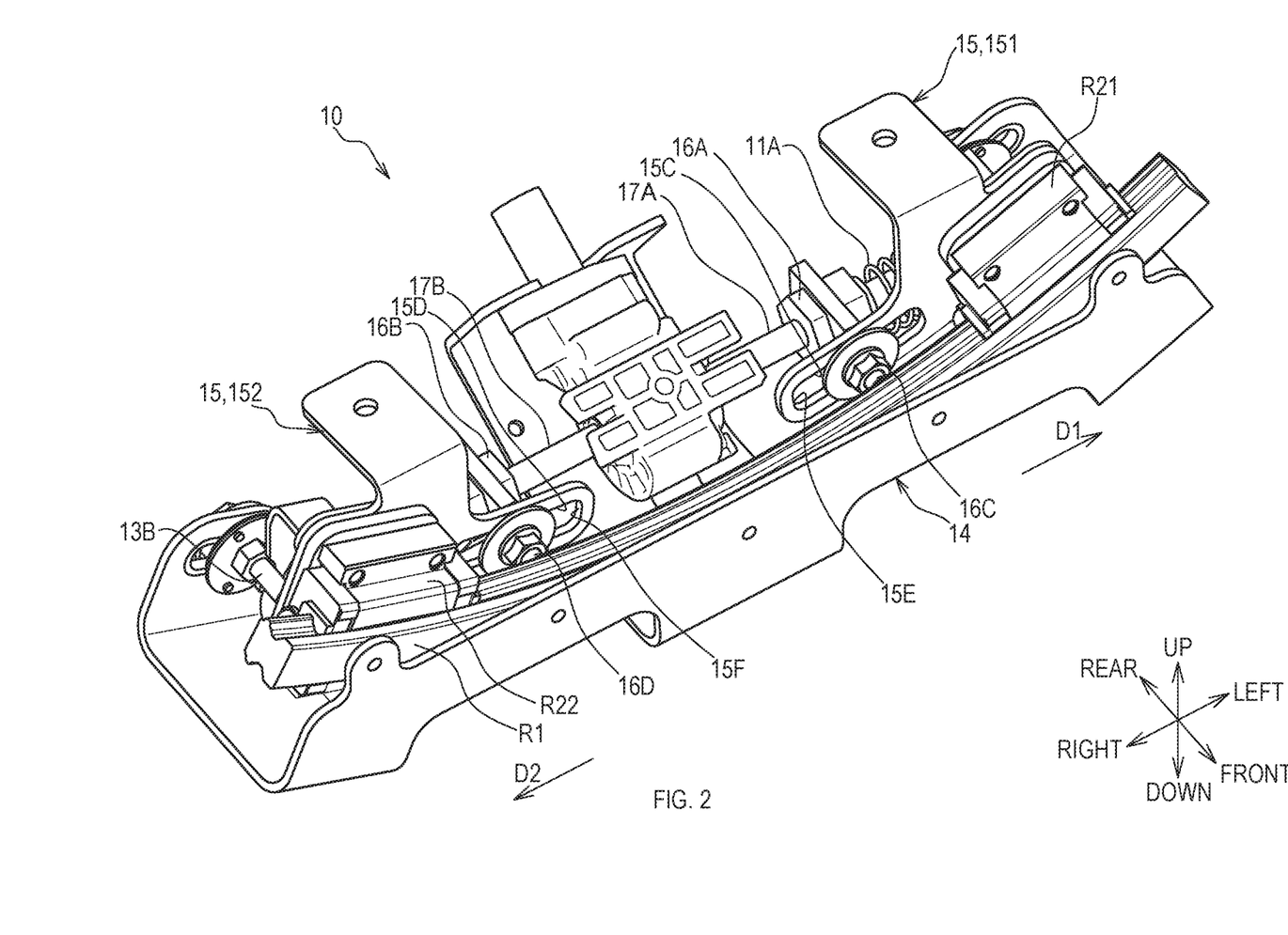
FIG. 2 is a view showing a preloading device.

Specifically, the movable portion 7 is fixed to a first displacement member 151 and a second displacement member 152 that are shown in FIG. 2. The first displacement member 151 is fixed to a first movable block R21. The second displacement member 152 is fixed to a second movable block R22.

The first movable block R21 and the second movable block R22 are slidably placed on the guide rail R1. The term, displacement member 15 in the following descriptions collectively refers to the first displacement member 151 and the second displacement member 152.

2. Displacement Regulator 2.1 Overview of Displacement Regulator

<Schematic Configuration of Displacement Regulator>

Figure 3:
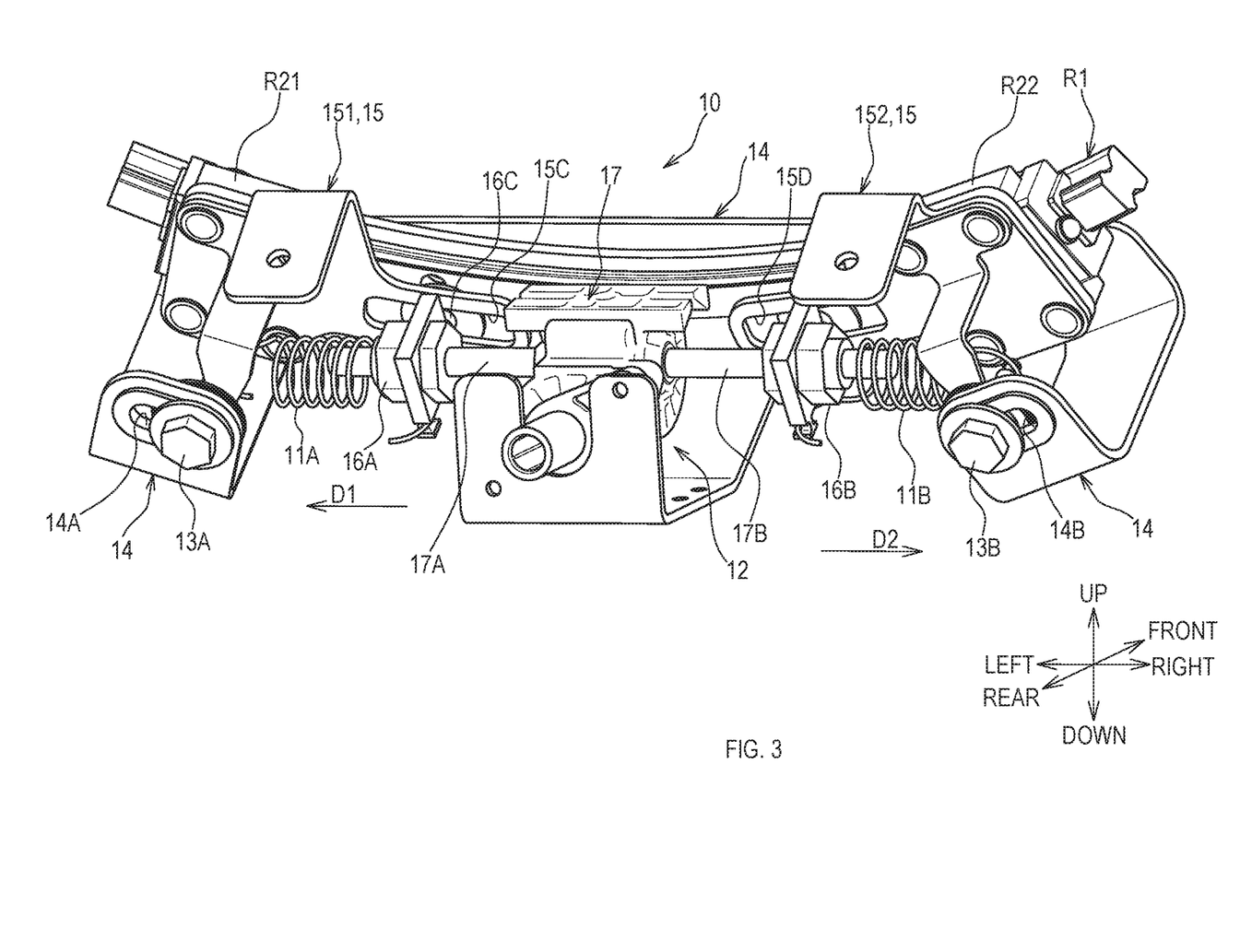
FIG. 3 is a view showing the preloading device.
Figure 4:
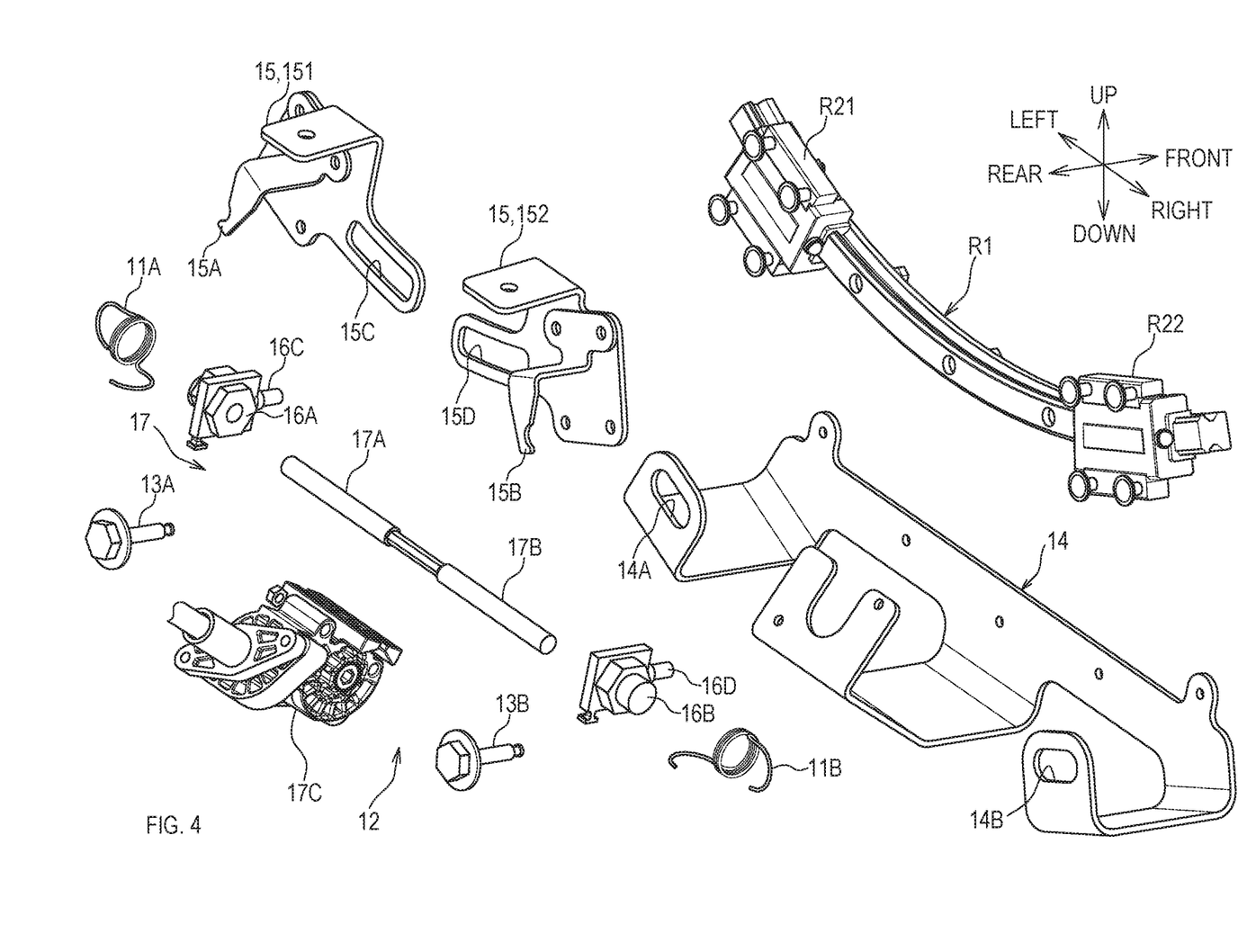
FIG. 4 is an exploded view of the preloading device.

A displacement regulator 10 shown in FIGS. 2 and 3 regulates displacement of the movable portion 7. As shown in FIG. 4, the displacement regulator 10 comprises at least a first spring 11A, a second spring 11B, a preloading device 12, and the like.

<First Spring and Second Spring>

The first spring 11A is an elastic member. As the movable portion 7 is displaced in the first direction D1 (see, FIG. 3), the first spring 11A can exert an elastic force to displace the displaced movable portion 7 toward the neutral position. In the first direction D1, the movable portion 7 is displaced leftward, for example.

The second spring 11B is an elastic member. As the movable portion 7 is displaced in the second direction D2 (see, FIG. 3), the second spring 11B can exert an elastic force to displace the displaced movable portion 7 toward the neutral position. The second direction D2 is different from, in other words, opposite to the first direction D1. Specifically, in the second direction D2, the movable portion 7 is displaced rightward, for example.

<Respective Coupling Portions for First Spring and Second Spring>

In a first end, the first spring 11A is hooked on and engaged with a first movable pin 13A shown in FIG. 4. The first end of the first spring 11A is directed in the first direction D1 (in the present embodiment, a left end of the first spring 11A).

In a first end, the second spring 11B is hooked on and engaged with a second movable pin 13B. The first end of the second spring 11B is directed in the second direction D2 (a right end of the second spring 11B, in the present embodiment). In one example, the first spring 11A and the second spring 11B of the present embodiment each are a coil spring having the same spring constant.

The first movable pin 13A and the second movable pin 13B are displaceable with respect to a fixing member 14 and the displacement member 15. Respective displacement directions of the first movable pin 13A and the second movable pin 13B correspond to displacement directions of the movable portion 7, in other words, are substantially parallel to the seat width axis.

Figure 5:
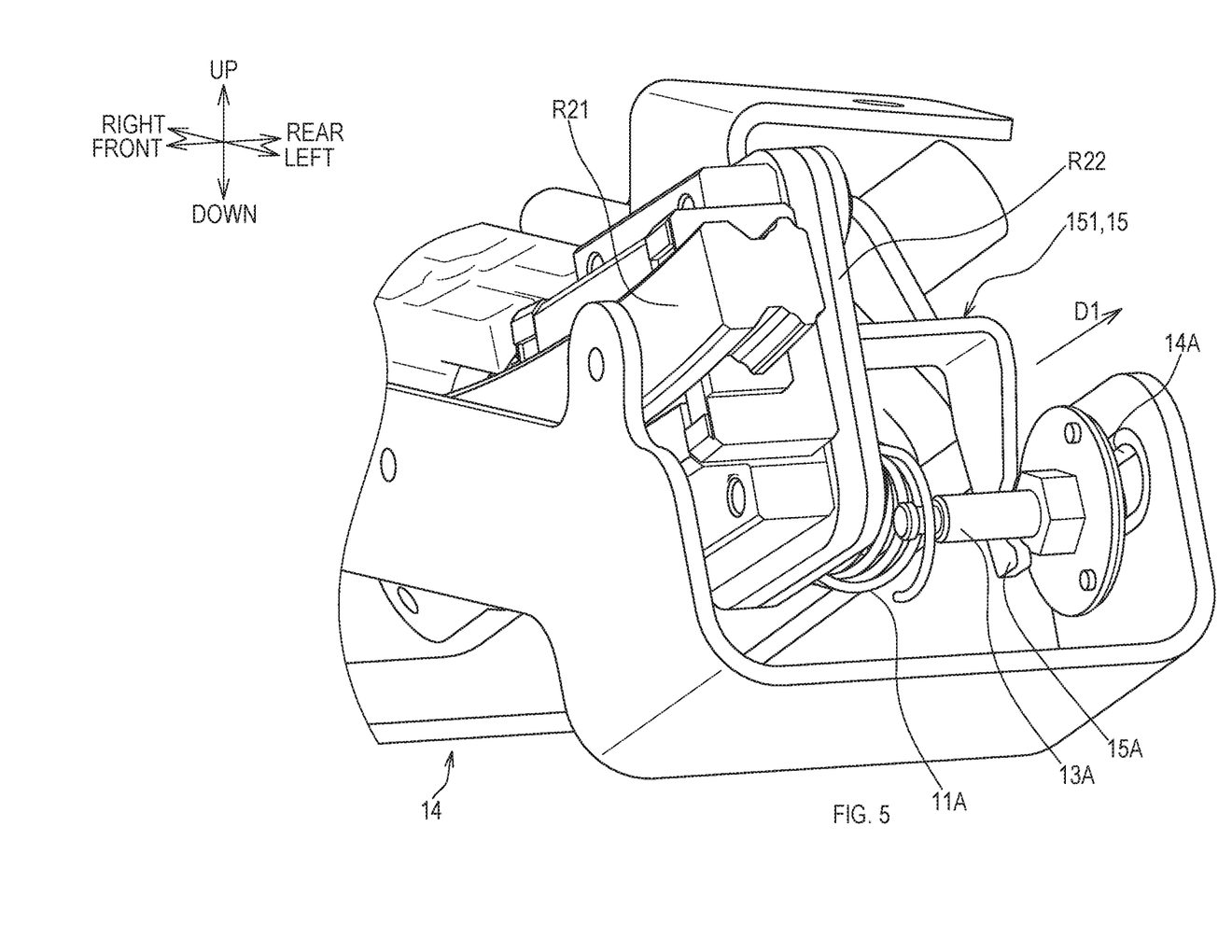
FIG. 5 is a view showing a first engaging portion.

The fixing member 14 is fixed to the seat frame 9. The displacement member 15 is displaced together with the movable portion 7. The fixing member 14 includes a first elongated fixing hole 14A and a second elongated fixing hole 14B, each comprising an elongated shape. As shown in FIG. 5, the first displacement member 151 includes a first engaging portion 15A that can be engaged with the first movable pin 13A.

As the displacement member 15 is displaced in the first direction D1, the first engaging member 15A is engaged with the first movable pin 13A in a manner to contact and to be hooked on the first movable pin 13A. As the displacement member 15 is displaced in the second direction D2, the first engaging portion 15A is separated from the first movable pin 13A.

Figure 6:
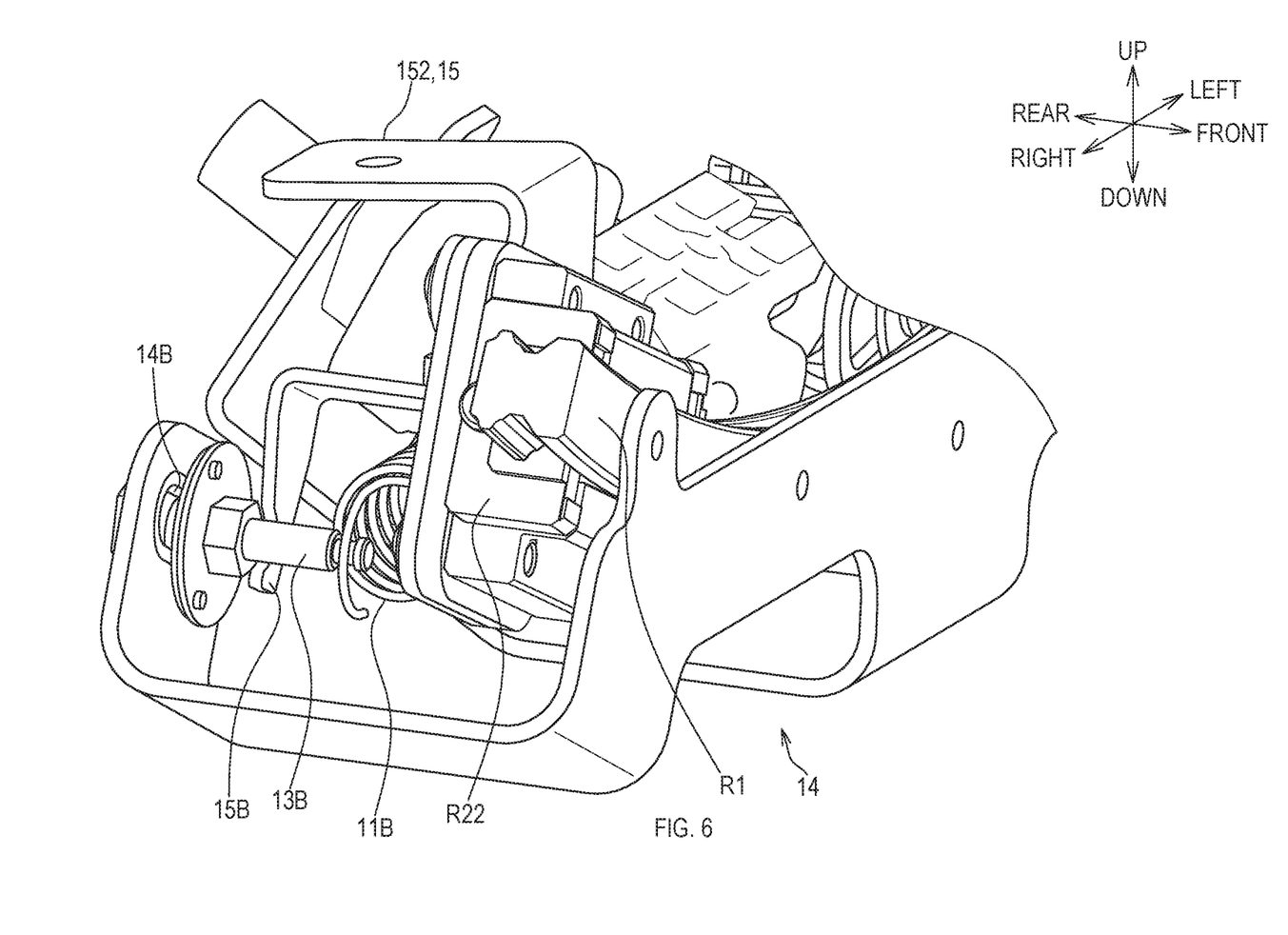
FIG. 6 is a view showing a second engaging portion.

As shown in FIG. 6, the second displacement member 152 includes a second engaging portion 15B that can be engaged with the second movable pin 13B. As the displacement member 15 is displaced in the second direction D2, the second engaging portion 15B is engaged with the second movable pin 13B in a manner to contact and to be hooked on the second movable pin 13B.

As the displacement member 15 is displaced in the first direction D1, the second engaging portion 15B is separated from the second movable pin 13B. The first elongated fixing hole 14A and the second elongated fixing hole 14B have respective longitudinal axes that correspond to displacement directions of the displacement member 15, in other words, are substantially parallel to the seat-width axis. The first elongated fixing hole 14A and the second elongated fixing hole 14B each are an elongated hole having a substantially arcuate shape.

The first movable pin 13A is displaceable along the longitudinal axis of the first elongated fixing hole 14A while penetrating through the first elongated fixing hole 14A. The second movable pin 13B is displaceable along the longitudinal axis of the second elongated fixing hole 14B while penetrating through the second elongated fixing hole 14B.

In a state where the displacement member 15, in other words, the movable portion 7 is placed in the neutral position, the first movable pin 13A is in contact with one of two longitudinal ends of the first elongated fixing hole 14A while contacting the first engaging portion 15A. The one longitudinal end is situated closer to the center of the seat-width axis than the other longitudinal end is.

In a state where the movable portion 7 is placed in the neutral position, the second movable pin 13B is in contact with one of two longitudinal ends of the second elongated fixing hole 14B while contacting the second engaging portion 15B. The one longitudinal end is situated closer to the center of the seat-width axis than the other longitudinal end is.

Specifically, as shown in FIG. 3, in the state where the movable portion 7 is placed in the neutral position, the first movable pin 13A is in contact with the right end of the first elongated fixing hole 14A and the second movable pin 13B is in contact with the left end of the second elongated fixing hole 14B.

<Operation of Respective Coupling Portions for First Spring and Second Spring>

As the movable portion 7 is displaced in the first direction D1 (leftward) from the neutral position, the first movable pin 13A, which is in contact with the left end of the first engaging portion 15A, is displaced leftward together with the movable portion 7, in other words, the displacement member 15 within the first elongated fixing hole 14A.

As the movable portion 7 is displaced in the first direction D1 (leftward) from the neutral position, the second movable pin 13B is immobile as it is in contact with the left end of the second elongated fixing hole 14B, whereas the second engaging portion 15B is displaced away from the second movable pin 13B.

As the movable portion 7 is displaced in the second direction D2 (rightward) from the neutral position, the second movable pin 13B, which is in contact with the right end of the second engaging portion 15B, is displaced rightward together with the displacement member 15 within the second elongated fixing hole 14B.

As the movable portion 7 is displaced in the second direction D2 (rightward) from the neutral position, the first movable pin 13A is immobile as it is in contact with the right end of the first elongated fixing hole 14A, whereas the first engaging portion 15A is displaced away from the first movable pin 13A.

In other words, the first movable pin 13A serves as a first coupling portion to displace the first end of the first spring 11A in accordance with the movable portion 7 as the movable portion 7 is displaced in the first direction D1. The second movable pin 13B serves as a second coupling portion to displace the first end of the second spring 11B in accordance with the movable portion 7 as the movable portion 7 is displaced in the second direction D2.

2.2 Preloading Device

<Overview of Preloading Device>

The preloading device 12 varies an initial load of the first spring 11A (a first preload) and an initial load of the second spring 11B (a second preload). The first preload corresponds to an elastic force that is applied to the movable portion 7 by the first spring 11A when the movable portion 7 is placed in the neutral position.

The second preload corresponds to an elastic force that is applied to the movable portion 7 by the second spring 11B when the movable portion 7 is placed in the neutral position. Here, the preloading device 12 of the present embodiment can vary these two preloads simultaneously.

As shown in FIG. 3, the preloading device 12 comprises at least a first adjustment nut 16A, a second adjustment nut 16B, a displacement mechanism 17, and the like. The first adjustment nut 16A engages thereto the second end (the right end, in the present embodiment) of the first spring 11A.

The second adjustment nut 16B engages thereto the second end (the left end, in the present embodiment) of the second spring 11B. The displacement mechanism 17 displaces the first adjustment nut 16A and the second adjustment nut 16B in the first direction D1 or in the second direction D2.

The displacement member 15 includes a first hole 15C and a second hole 15D. The first hole 15C and the second hole 15D each are an elongated hole that extends along axis substantially parallel to the displacement directions of the movable portion 7. The first hole 15C and the second hole 15D of the present embodiment each extend along a longitudinal axis thereof in a linear manner.

Figure 7:
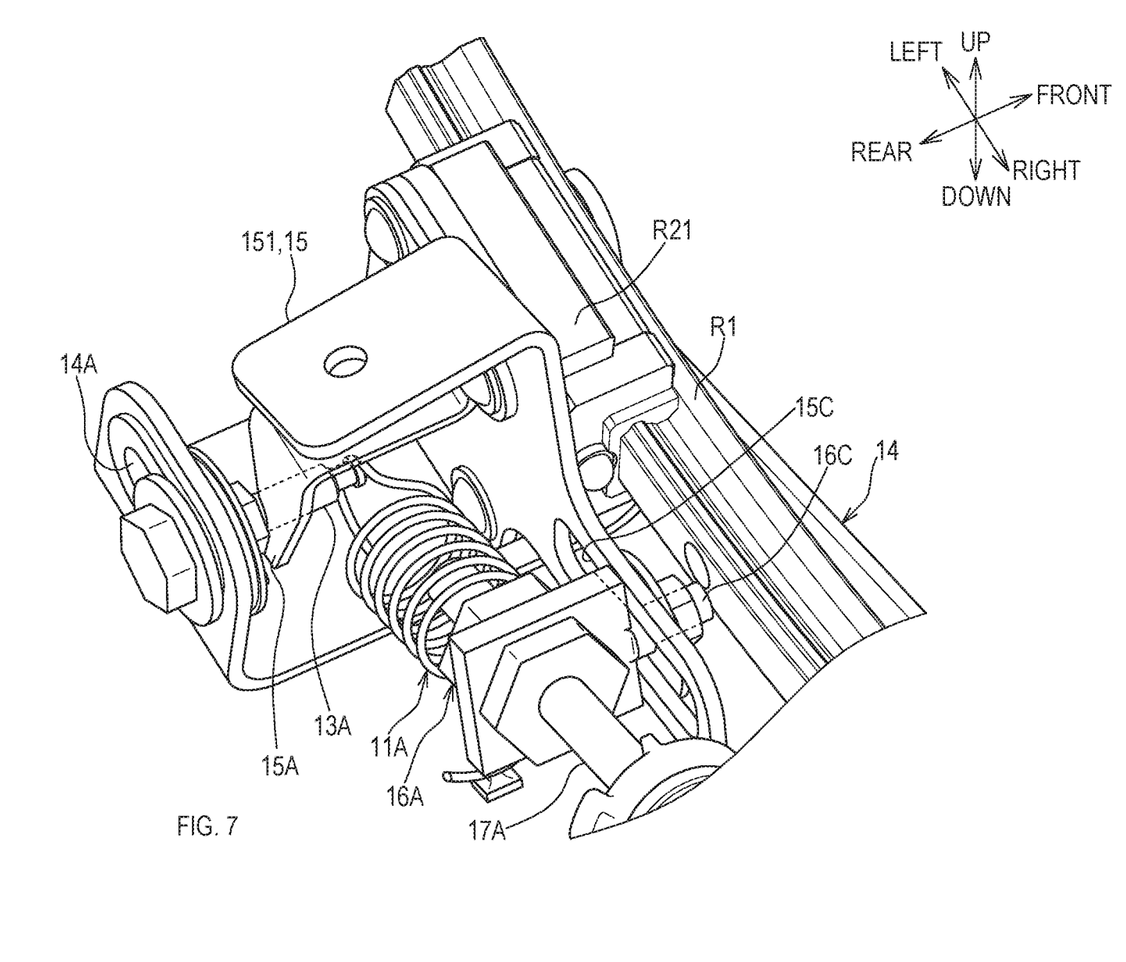
FIG. 7 is a view showing a first adjustment nut.

As shown in FIG. 7, the first hole 15C has a first locking pin 16C inserted therein. The first locking pin 16C is slidable along the longitudinal axis of the first hole 15C. The first locking pin 16C is integral with the first adjustment nut 16A to be displaced together with the first adjustment nut 16A.

Figure 8:
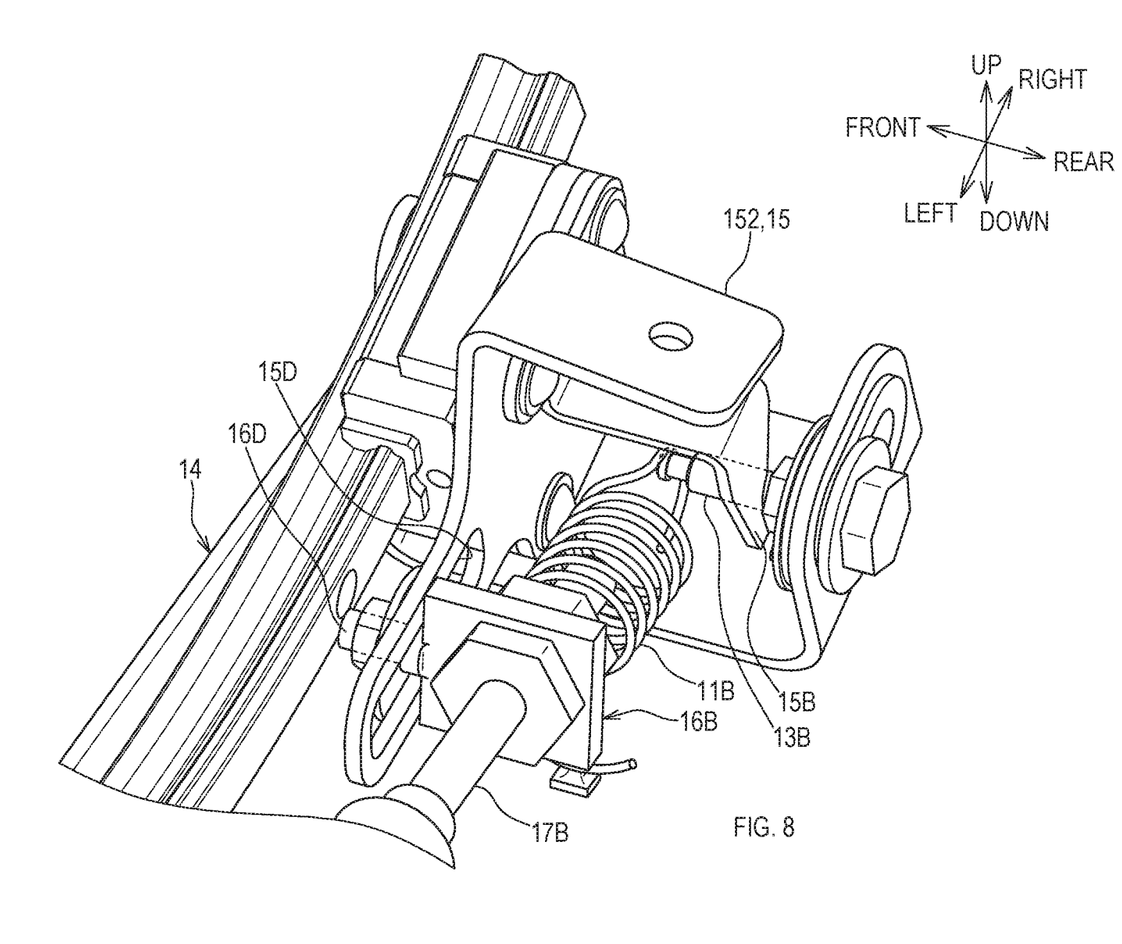
FIG. 8 is a view showing a second adjustment nut.

As shown in FIG. 8, the second hole 15D has a second locking pin 16D inserted therein. The second locking pin 16D is slidable along the longitudinal axis of the second hole 15D. The second locking pin 16D is integral with the second adjustment nut 16B to be displaced together with the second adjustment nut 16B.

<Displacement Mechanism>

As shown in FIG. 4, the displacement mechanism 17 comprises a first screw rod 17A, a second screw rod 17B, an actuator 17C, and the like. The first screw rod 17A is inserted into and screwed into the first adjustment nut 16A (see, FIG. 7).

The second screw rod 17B is inserted into and screwed into the second adjustment nut 16B (see, FIG. 8). The actuator 17C generates a rotation force to rotate at least one of the first screw rod 17A or the second screw rod 17B.

As shown in FIG. 4, in the present embodiment, the first screw rod 17A and the second screw rod 17B are integral with each other as a single rod. Thus, the actuator 17C rotates the first screw rod 17A and the second screw rod 17B simultaneously to the same angle.

Here, the first screw rod 17A and the second screw rod 17B are formed into a single screw rod. In this single screw rod, respective threads of the first screw rod 17A and the second screw rod 17B are directed oppositely to each other and have the same pitch dimensions. Thus, as the single screw rod rotates in a first direction, the first adjustment nut 16A and the second adjustment nut 16B are displaced the same distance to come closer to each other.

As the single screw rod rotates in a second direction, the first adjustment nut 16A and the second adjustment nut 16B are displaced the same distance to be spaced from each other. In other words, the first adjustment nut 16A and the second adjustment nut 16B are always placed in a symmetric position across a virtual vertical plane So (see, FIG. 9) that crosses the movable portion 7 placed in the neutral position regardless of a rotation angle of the single screw rod. More specifically, the vertical plane So crosses, in one example, the swing point of the movable portion 7 and the center of gravity of the movable portion 7 placed in the neutral position.

2.3 Operation of Displacement Regulator

<Overview of Operation (See, FIG. 9)>

Figure 9:
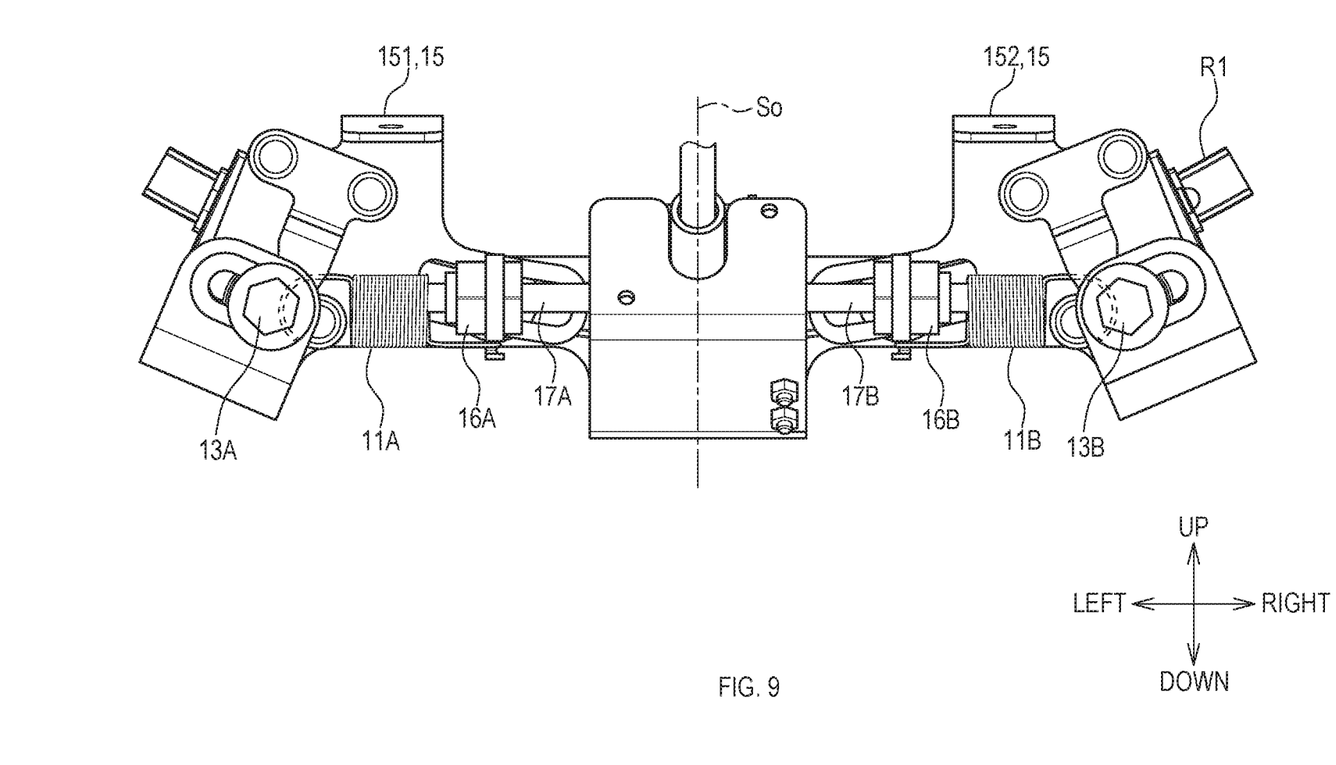
FIG. 9 is a view showing the preloading device.

As the movable portion 7 is displaced in the first direction D1 (leftward) from the neutral position, the first movable pin 13A is engaged with the first engaging portion 15A. As a result, the first movable pin 13A is displaced together with the displacement member 15 in the first direction D1 (leftward), whereas the second movable pin 13R is immobile.

The displacement of the movable portion 7 in the first direction D1 (leftward) from the neutral position causes the first spring 11A to extend and to thereby increase its elastic force. Therefore, the first spring 11A exerts a restoring force to displace the movable portion 7 to the neutral position.

As the movable portion 7 is displaced in the second direction D2 (rightward) from the neutral position, the second movable pin 13B is engaged with the second engaging portion 15B. As a result, the second movable pin 13B is displaced together with the displacement member 15 in the second direction D2 (rightward), whereas the first movable pin 13A is immobile.

The displacement of the movable portion 7 in the second direction D2 (rightward) from the neutral position causes the second spring 11B to extend and to thereby increase its elastic force. Therefore, the second spring 11B exerts a restoring force to displace the movable portion 7 to the neutral position.

In other words, as the movable portion 7 is swung from the neutral position along the seat-width axis, the movable portion 7 always has tendency to be displaced to the neutral position due to the elastic force derived from the first spring 11A or the elastic force derived from the second spring 11B. In other words, the first spring 11A and the second spring 11B generate the respective restoring forces to hold the movable portion 7 in the neutral position.

<Operation of Preloading Device>

As the first screw rod 17A and the second screw rod 17B rotate, the first adjustment nut 16A and the second adjustment nut 16B come closer to each other or are spaced from each other while maintaining a positional relationship to be symmetric across the vertical plane So. This provides variation in distance between the first adjustment nut 16A and the second adjustment nut 16B.

Accordingly, as the first screw rod 17A and the second screw rod 17B rotate with the movable portion 7 being placed in the neutral position, the first adjustment nut 16A and the second adjustment nut 16B are displaced in an interlocking manner with the rotation with respect to the first movable pin 13A and the second movable pin 13B, respectively. In other words, as the first screw rod 17A and the second screw rod 17B rotate, the first preload and the second preload are varied interlockingly.

The movable portion 7 has a load such as an inertial force applied thereto in an exertion direction of the load. In response to this load overcoming the first preload or the second preload, the movable portion 7 is displaced in the exertion direction. Therefore, the movable portion 7 is unlikely to be displaced as the first preload or the second preload becomes larger and is likely to be displaced as the first preload or the second preload becomes smaller.

<Locking Function>

A locking function restricts the displacement member 15 to be displaced with respect to the fixing member 14. Specifically, as the locking function is exerted, the movable portion 7 is restricted to be displaced with respect to the seat frame 9.

During the exertion of the locking function, the first locking pin 16C is in contact with an end 15E of the first hole 15C (see, FIG. 2) and the second locking pin 16D is in contact with an end 15F of the second hole 15D (see, FIG. 2). The end 15F of the second hole 15D is one of two ends of the second hole 15D and is placed in a symmetric position to the end 15E of the first hole 15C across the vertical plane So. More specifically, the end 15E is one of two ends of the first hole 15C and is situated closer to the center of the seat-width axis than the other end is. The end 15F is situated closer to the center of the seat-width axis than the other end is.

During the exertion of the locking function, the displacement of the movable portion 7 in the first direction D1 is restricted by the first locking pin 16C. The displacement of the movable portion 7 in the second direction D2 is restricted by the second locking pin 16D. In other words, the movable portion 7 cannot be displaced in any directions and thus the displacement of displacement member 15 is restricted.

Figure 10:
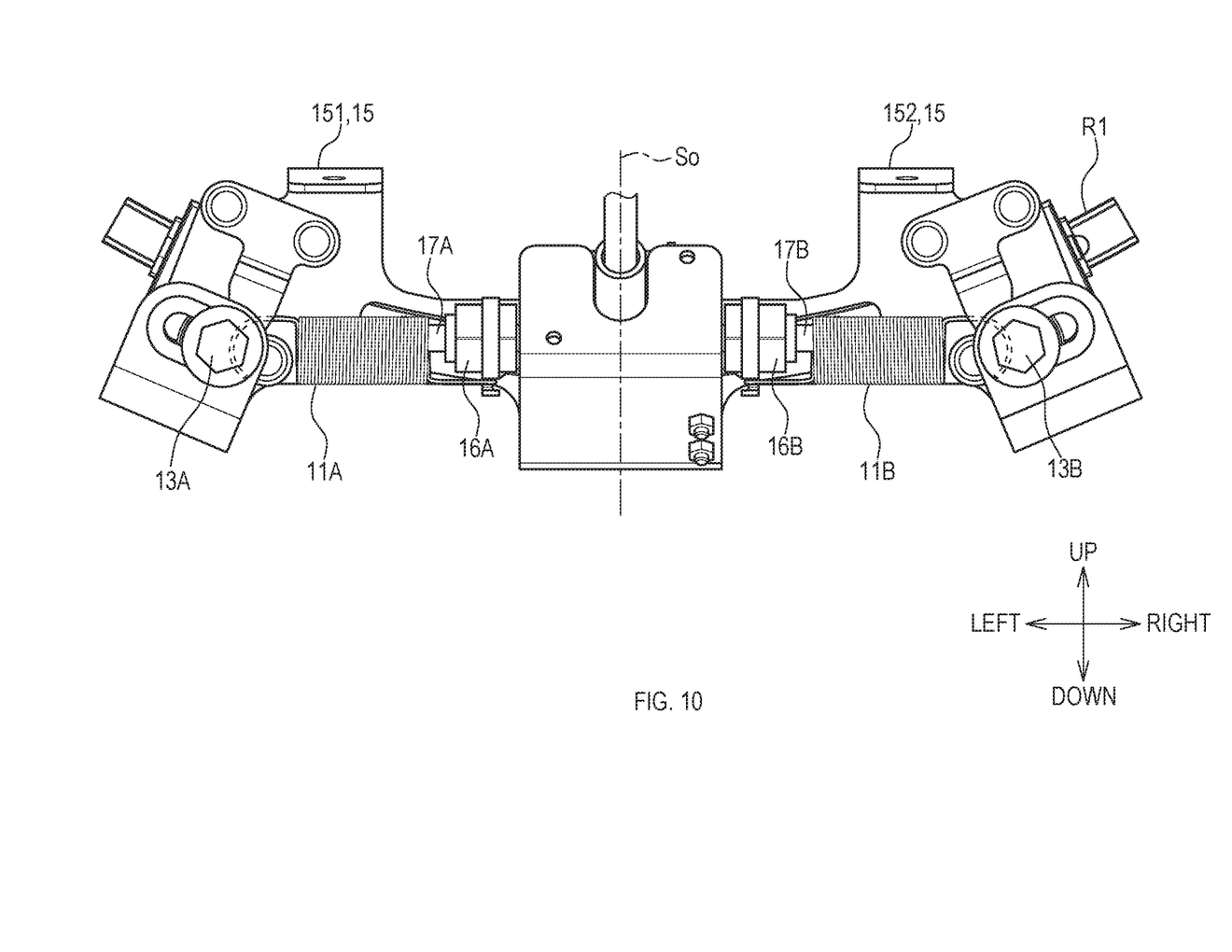
FIG. 10 is a view showing the preloading device.

In the present embodiment, during the exertion of the locking function, the first adjustment nut 16A is positioned the greatest distance from the first movable pin 13A and the second adjustment nut 16B is positioned the greatest distance from the second movable pin 13B, as shown in FIG. 10.

3. Characteristics of Vehicle Seat of the Present Embodiment

The vehicle seat 1 comprises the preloading device 12. The preloading device 12 can vary at least one of the first preload or the second preload. The first preload corresponds to the elastic force that is applied to the movable portion 7 by the first spring 11A when the movable portion 7 is placed in the neutral position. The second preload corresponds to the elastic force that is applied to the movable portion 7 by the second spring 11B when the movable portion 7 is placed in the neutral position. This can inhibit the movable portion 7 from being responsively displaced more than necessary.

The preloading device 12 can change a position of at least one of the second end of the first spring 11A or the second end of the second spring 11B. This enables at least one of the first preload of the first spring 11A or the second preload of the second spring 11B to be easily varied.

The preloading device 12 can exert the locking function to restrict the displacement member 15 to be displaced with respect to the fixing member 14. This enables the displacement of the movable portion 7 to be restricted, which can therefore inhibit the movable portion 7 from being responsively displaced more than necessary.

In exerting the locking function, the preloading device 12 brings the first locking pin 16C into contact with the end 15E of the first hole 15C and brings the second locking pin 16D into contact with the end 15F of the second hole 15D. This allows the displacement of the movable portion 7 to be restricted by the first locking pin 16C and the second locking pin 16D, to thereby exert the locking function.

The displacement mechanism 17 comprises the first adjustment nut 16A, the second adjustment nut 16B, the first screw rod 17A, and the second screw rod 17B. The displacement mechanism 17 rotates the first screw rod 17A and the second screw rod 17B to thereby displace the first adjustment nut 16A and the second adjustment nut 16B. This can simplify a configuration of the displacement mechanism 17 in comparison with a configuration in which a link mechanism is used to vary an initial load, for example.

(Other Embodiments)

In the vehicle seat 1 of the above-described embodiment, the seatback 5 includes the movable portion 7. However, the present disclosure is not limited hereto. Specifically, the present disclosure may have a configuration in which the seat cushion 3 includes the movable portion 7 or a configuration in which the seat cushion 3 and the seatback 5 each have the movable portion 7, for example.

In the above-described embodiment, the coil springs are used for the first spring 11A and the second spring 11B. However, the present disclosure is not limited hereto. Specifically, in the present disclosure, the first spring 11A and the second spring 11B each may be formed with a spring of another type, such as a torsion coil spring or a mainspring.

In the above-described embodiment, the respective first ends of the first spring 11A and the second spring 11B are coupled to the movable portion 7 via the displacement member 15 and the respective second ends of the first spring 11A and the second spring 11B are coupled to the fixing member 14 and are displaced by the displacement mechanism 17.

However, the present disclosure is not limited hereto. Specifically, the present disclosure may have a configuration in which the respective first ends of the first spring 11A and the second spring 11B are displaced with respect to the displacement member 15, for example. In this configuration, the respective second ends of the first spring 11A and the second spring 11B each may have a similar configuration as in the above-described embodiment or an immobile configuration with respect to the fixing member 14.

The above-described embodiment enables the exertion of the locking function. However, the present disclosure is not limited hereto. Specifically, the present disclosure may have a configuration in which the locking function is removed, for example.

In the above-described embodiment, during the exertion of the locking function, the first locking pin 16C is in contact with the end 15E of the first hole 15C and the second locking pin 16D is in contact with the end 15F of the second hole 15D. However, the present disclosure is not limited hereto.

Specifically, the present disclosure may have the following configurations in which, during the exertion of the locking function, (a) the first locking pin 16C is in contact with the other end of the first hole 15C situated opposite to the end 15 E and the second locking pin 16D is in contact with the other end of the second hole 15D situated opposite to the end 15F or (b) a latch member engages the displacement member 15 or the movable portion 7, for example.

The first elongated fixing hole 14A, the first hole 15C, and other holes of the above-described embodiment each are formed with a through hole. However, the present disclosure is not limited hereto. Specifically, in the present disclosure, an unpenetrated groove may form each of the first elongated fixing hole 14A, the first hole 15C, and other holes, for example.

In the above-described embodiment, respective pulling elastic forces derived from two of the first spring 11A and the second spring 11B are used to restore the movable portion 7 to the neutral position. However, the present disclosure is not limited hereto. Specifically, the present disclosure may have a configuration in which a pulling elastic force or a compressive elastic force derived from one spring is used to restore the movable portion 7 to the neutral position, for example.

In the above-described embodiment, the vehicle seat of the present disclosure is used for an automobile. However, the present disclosure may be used also for seats for railroad vehicles, ships, boats and aircrafts and for built-in seats, such as seats used in theaters and homes, for example.

Moreover, the present disclosure may be formed in combination of at least two of the above-described embodiments or formed by removing any one of the constituent elements shown in the above-described embodiments.

What is claimed is:

1. A vehicle seat mounted onto a vehicle, comprising:
a movable portion included in at least one of a seatback or a seat cushion, the movable portion being displaceable with respect to a seat frame;
a first spring being capable of exerting an elastic force as the movable portion is displaced in a first direction, the elastic force exerted by the first spring being used to displace the displaced movable portion toward a specified neutral position;
a first coupling portion configured to displace a first end of the first spring together with the movable portion as the movable portion is displaced in the first direction;
a second spring being capable of exerting an elastic force as the movable portion is displaced in a second direction that is different from the first direction, the elastic force exerted by the second spring being used to displace the displaced movable portion toward the neutral position;
a second coupling portion configured to displace a first end of the second spring together with the movable portion as the movable portion is displaced in the second direction;
a preloading device being capable of varying at least one of an elastic force applied to the movable portion by the first spring when the movable portion is placed in the neutral position or an elastic force applied to the movable portion by the second spring when the movable portion is placed in the neutral position,
wherein the preloading device is configured to include:
a first adjustment nut with which a second end of the first spring is engaged;
a second adjustment nut with which a second end of the second spring is engaged;
a first screw rod inserted into the first adjustment nut;
a second screw rod inserted into the second adjustment nut; and
an actuator to rotate at least one of the first screw rod or the second screw rod.

2. The vehicle seat according to claim 1, further comprising:
a displacement member displaced together with the movable portion;
a first locking pin displaced together with the first adjustment nut; and
a second locking pin displaced together with the second adjustment nut,
wherein the displacement member includes:
a first hole into which the first locking pin is inserted; and
a second hole into which the second locking pin is inserted,
wherein the first hole enables the first locking pin to be displaced in directions that are parallel to axial directions of the first screw rod,
wherein the second hole enables the second locking pin to be displaced in directions that are parallel to axial directions of the second screw rod,
wherein the preloading device is capable of exerting a locking function, and
wherein, during exertion of the locking function, the first locking pin is in contact with an end of the first hole and the second locking pin is in contact with an end of the second hole, the end of the second hole being placed in a symmetric position to the end of the first hole across a virtual vertical plane that crosses the movable portion placed in the neutral position.

3. The vehicle seat according to claim 1,
wherein the first screw rod and the second screw rod are integral with each other as a single rod member, and
wherein the first screw rod and the second screw rod have respective threads that are directed oppositely to each other and have the same pitch dimensions.

\* \* \* \* \*